United States Patent
Zhuang et al.

(10) Patent No.: US 9,535,843 B2
(45) Date of Patent: Jan. 3, 2017

(54) MANAGED MEMORY CACHE WITH APPLICATION-LAYER PREFETCHING

(71) Applicant: LinkedIn Corporation, Mountain View, CA (US)

(72) Inventors: Zhenyun Zhuang, Belmont, CA (US); Haricharan K. Ramachandra, Fremont, CA (US); Badrinath K. Sridharan, Saratog, CA (US); Cuong H. Tran, Los Altos, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 2 days.

(21) Appl. No.: 14/624,168

(22) Filed: Feb. 17, 2015

(65) Prior Publication Data

US 2016/0239423 A1    Aug. 18, 2016

(51) Int. Cl.
*G06F 12/08*    (2016.01)

(52) U.S. Cl.
CPC ... *G06F 12/0862* (2013.01); *G06F 2212/1021* (2013.01); *G06F 2212/602* (2013.01)

(58) Field of Classification Search
CPC ............. G06F 12/0862; G06F 2212/6026; G06F 2212/602; G06F 2212/1021; G06F 2212/6024
USPC .................................. 711/137, 118
See application file for complete search history.

(56) References Cited

U.S. PATENT DOCUMENTS

| | | |
|---|---|---|
| 5,752,275 A | 5/1998 | Hammond |
| 6,493,812 B1 | 12/2002 | Lyon |
| 7,676,630 B2 * | 3/2010 | Qiao .................. G06F 12/0862 |
| | | 711/118 |
| 8,095,764 B1 | 1/2012 | Bauer et al. |
| 9,158,578 B1 | 10/2015 | Derbeko |
| 2004/0123033 A1 | 6/2004 | Rudelic |
| 2005/0165758 A1 | 7/2005 | Kasten |
| 2006/0168403 A1 | 7/2006 | Kolovson |
| 2007/0283125 A1 | 12/2007 | Manczak et al. |
| 2008/0148341 A1 | 6/2008 | Ferguson |
| 2008/0288742 A1 | 11/2008 | Hepkin et al. |
| 2009/0132770 A1 | 5/2009 | Lin |
| 2011/0320789 A1 | 12/2011 | Prasky |
| 2012/0054466 A1 | 3/2012 | Devendran et al. |
| 2012/0304171 A1 | 11/2012 | Joshi et al. |

(Continued)

*Primary Examiner* — Jasmine Song
(74) *Attorney, Agent, or Firm* — Park, Vaughan, Fleming & Dowler LLP

(57) ABSTRACT

In order to prevent data thrashing and the resulting performance degradation, a computer system may maintain an application-layer cache space to more effectively use physical memory and, thus, significantly improve an application-memory hit ratio and reduce disk input-output operations. In particular, the computer system may maintain a managed memory cache that is separate from a page cache. The managed memory cache may be managed according to predefined caching rules that are separate from the caching rules in the operating system that are used to manage the page cache, and these caching rules may be application-aware. Subsequently, when data for an application is accessed, the computer system may prefetch the data and associated information from disk and store the information in the managed memory cache based on data correlations associated with the application.

20 Claims, 13 Drawing Sheets

(56) References Cited

U.S. PATENT DOCUMENTS

| | | | |
|---|---|---|---|
| 2013/0290641 A1* | 10/2013 | Corrie | G06F 12/0875 |
| | | | 711/133 |
| 2015/0019806 A1 | 1/2015 | Alam et al. | |
| 2015/0032966 A1* | 1/2015 | Gupta | G06F 12/121 |
| | | | 711/133 |
| 2015/0127912 A1* | 5/2015 | Solihin | G06F 12/08 |
| | | | 711/125 |
| 2015/0207872 A1 | 7/2015 | Stiemerling et al. | |

* cited by examiner

MANAGED MEMORY CACHE WITH APPLICATION-LAYER PREFETCHING

CROSS-REFERENCE TO RELATED APPLICATION

This application is related to U.S. Non-provisional application Ser. No. 14/624,188, entitled "Application-Layer Managed Memory Cache," by Zhenyun Zhuang, Haricharan Ramachandra, Badrinath K. Sridharan, and Cuong H. Tran, filed on 17 Feb. 2015, the contents of which are herein incorporated by reference.

BACKGROUND

Field

The described embodiments relate to techniques for caching files. More specifically, described embodiments relate to techniques for application-layer caching of files in a managed memory cache that has application-layer caching rules.

Related Art

Applications are increasingly using memory-mapped files to manage their data in order to achieve improved performance. Memory-mapped (mmap) files provide data mapping between disk files and the virtual memory space of a computer system. This may allow applications executing in an environment of the computer system to access the virtual memory when they read/write the mapped files.

Moreover, when applications read data from disk files, corresponding pages (which, for an illustrative operating system, are typically each 4 kB) are allocated in memory and filled with data from disk, so that later read/write accesses can apply to the memory pages rather than disk files. By using this page-caching technique in the operating system to cache data, memory-mapped files can avoid time-consuming disk input-output (IO) operations. In particular, reading and writing of memory-mapped files is typically faster than traditional disk-file operations because disk-file operations rely on system calls and involve data copying between user space and kernel space. In general, system calls are significantly slower than accessing local memory. In addition, accessing memory-mapped files usually does not result in data copying between user space and kernel space.

Memory mapping works particularly well when the mapped data can be entirely loaded into physical random access memory (RAM), a scenario in which the data read access results in a 'page cache-hit.' However, as the data size increases beyond the size of physical RAM (and, more precisely, beyond the size of physical RAM that can be used for operating-system page caches), naive use of memory-mapped files can lead to significantly degraded performance because of the performance costs associated with a 'page cache-misses' and disk IO. In the present discussion, note that 'physical RAM' denotes the maximum page-cache size. In addition, note that, in general, read access from applications (e.g., database querying) is typically blocking, while write access by applications is typically non-blocking. Consequently, read accesses are more likely to affect application performance than write accesses.

Thus, memory-mapped files can result in severe memory-inefficiency problems. In particular, for applications that use data larger in size than physical RAM, not all the data can be loaded into memory at one time. (Note that 'data size' as used here refers to the 'working data size,' i.e., the amount of data that is actually accessed by the application.) Consequently, attempting to cache new data may cause some pages to be evicted from memory. However, later when the evicted data are needed, they will need to be brought into memory again, thereby kicking out other data (which is referred to as 'data thrashing'). Data thrashing can incur more-than-necessary disk read IO. Because disk IO is typically slow (and can easily become a performance bottleneck of the entire computer system), when data thrashing occurs the application response time is often increased and the use of memory mapping may paradoxically degrade the overall performance.

Figure 1:
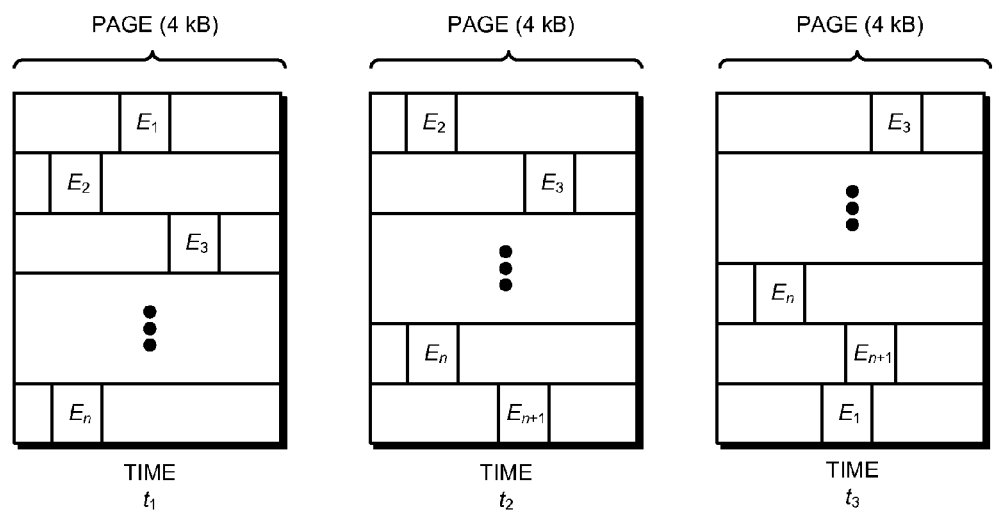
FIG. 1 is a drawing illustrating data thrashing in an existing caching technique.

Table 1 provides prefetched memory-mapped (mmap) files in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In order to prevent data thrashing and the resulting performance degradation, a computer system may maintain an application-layer cache space to more effectively use physical memory and, thus, significantly improve an application-memory hit ratio and reduce disk input-output operations. In particular, the computer system may maintain a managed memory cache that is separate from a page cache. The managed memory cache may be managed according to predefined caching rules that are separate from the caching rules in the operating system that are used to manage the page cache, and these caching rules may be application-aware. Subsequently, when data for an application is accessed, the computer system may prefetch the data and associated information from disk and store the information in the managed memory cache based on data correlations associated with the application.

This application-layer caching technique may significantly improve memory usage efficiency and the performance of the computer system. In particular, the application-layer caching technique may: more densely pack useful data into memory; reduce cache-misses and data thrashing; reduce disk-file reads and operating-system-level prefetching; allow the use of multiple, different (application-aware) cache replacement techniques; and dynamically determine the cache size and cache granularity. Collectively, these features of the application-layer caching technique may help ensure that memory mapping of files improves performance even when the working data size exceeds the physical memory available for file or page caching.

We now describe embodiments of the application-layer caching technique, its use, and the computer system. The performance issues associated with memory mapping are typically the result of ineffective use of physical memory, which is further caused by multiple interleaving reasons. In particular, data thrashing is usually the result of the interactions between operating-system-level mechanisms (e.g., page caching and disk prefetching) and application read-access patterns. As described further below, in general this interaction is very complicated. Briefly, in existing caching techniques, memory mapped data typically exhibit the default operating-system page size, such as 4 kB. Therefore, when data smaller in size than the default page size are accessed, wasted memory results. In an extreme example, even if the application only requests a single byte of data, at least 4 kB of data may be read and loaded into memory, which results in (4 k–1) bytes of wasted memory.

Moreover, disk-file prefetching can make the data thrashing even worse. Notably, when reading data from disk files, the operating system may decide to prefetch (or readahead) the data around the requested data, and may put the prefetched data into page caches in an attempt to reduce the latency of future read/write accesses. Although prefetching in many scenarios improves the IO performance, in the aforementioned scenario it can severely degrade the performance.

Furthermore, operating-system page caching is usually unaware of application usage or data-access patterns. Instead, operating-system page caching typically applies a least-recently used (LRU) replacement technique, which is blind as to which pages are more important to particular applications.

Therefore, in scenarios where the data size exceeds the physical RAM size, the physical RAM may become a 'precious' resource that needs to be used efficiently so that the 'cache-hit' ratio increases and applications can get good response times when reading the data. From this perspective, the naive use of memory-mapped files can cause the physical memory to be inefficiently used, which can result in a significantly lower cache-hit ratio.

Continuing this discussion in more detail, a simple use of memory mapping often results in inefficient use of memory. For simplicity, assume that an application encodes all the data it uses as events, and that the events are randomly accessed (i.e., they are not accessed sequentially). Moreover, assume that each event has a size of about 100 bytes. As the application requests a series of random events (i.e., $E_1$, $E_2$, etc.), the physical memory may be gradually filled with the data read from the disk files. FIG. 1 presents a series of snapshots as to how the physical memory is used when it is full of application events. Even though a (4 kB) page can hold multiple events (e.g., 40 events per page), not all of the memory-held events are actually needed. Thus, the physical memory is not efficiently used because of the existence of other un-requested events. For example, if the random events are distributed sparsely enough, every 4 kB memory may only hold one useful event. In other words, in this scenario the memory efficiency is only about 1/40.

Moreover, the inefficient use of memory often results in data thrashing. In particular, when all active data cannot be loaded into memory, newly accessed data may cause eviction of other in-memory data because of the operating systems' page-replacement technique. This scenario is illustrated in FIG. 1. Prior to accessing the next event $E_{n+1}$, $E_1$ is in memory at time $t_1$. However, at time $t_2$, when $E_{n+1}$ is accessed and is brought into memory, $E_1$ and the page holding it are evicted. The result is that the new event $E_{n+1}$ is put at the bottom of the memory. Subsequently, when $E_1$ is needed again at time $t_3$, $E_1$, along with the data around it to form a page, are brought into memory, which kicks out $E_2$. Such data thrashing will inevitably happen as long as the active data size is larger than physical memory. Note that the extent of the data thrashing may be exacerbated by the aforementioned memory inefficiency, because as more memory is wasted, more data thrashing results.

Furthermore, memory inefficiency typically results in disk IO when new data are accessed. In addition, disk-file prefetching can significantly inflate the actual disk IO. This can be demonstrated using a simple workload in which memory maps a single file. This workload may be written in Java using MappedByteBuffer class and the file size may be 1 GB. In this workload, a fixed number of reads with different offsets between the beginning and the end of the files may be generated. For each offset, a single byte may be read (e.g., using a getChar( ) command), and the reading offsets may be spaced by a fixed length. The results for this workload are shown in Table 1, which presents prefetched mmap files. Note that the actual data being read from the disk in these results is much larger than the actual data requested by the application. For example, when the offset spacing is 1 MB and only 1 kB is requested by the application (i.e., 1 kB getChar( ) calls), the total data size read from the disk is about 771 MB, a difference of 771,000 times.

TABLE 1

| Offset Spacing (B) | Read Time/Read Bytes | Disk Reading Size (MB) | Transactions Per Second |
|---|---|---|---|
| 1k | 1M | 1005 | 10.6k |
| 2k | 500k | 1015 | 10.5k |
| 4k | 250k | 1025 | 10.6k |
| 6k | 166k | 1110 | 11.5k |
| 8k | 125k | 1063 | 4.5k |
| 16k | 60k | 1077 | 11k |
| 64k | 16k | 1072 | 10.2k |
| 1M | 1k | 771 | 8k |
| 10M | 100 | 77 | 804 |
| 20M | 50 | 38 | 400 |
| 50M | 20 | 16 | 174 |

By using memory mapping, the application may practically shake off the burden of its own memory management, and may delegate the memory management to the operating system's page caching. Note that operating-system page caching typically uses an internal-page replacement technique to determine which pages need to be evicted when there is a shortage of memory. This replacement technique usually is LRU-based, and thus is often totally unaware of the application characteristics. When a new page needs to be allocated, the operating system may simply choose the page that has been used least recently and evict it from memory, even though this page may include data that are more frequently needed and that may be desirable to keep in memory. Such application-unawareness is quite natural, because the underlying operating system usually wants to work in an application-independent fashion. In other words, the application unawareness is typically not a drawback of operating-system page caching. Instead, it is usually a drawback of simply relying on memory mapping by the application.

We now describe an application-layer caching technique that addresses the memory-inefficiency problem associated with using memory-mapped files when the active or working data size exceeds the physical memory. As noted previously, simple use of memory mapping often relies on operating-system page caching to perform an application's memory management. Consequently, the application may not manage its memory at all, and it may only use the operating system's shared memory space to cache data. While such an approach can simplify the design of the application, it may result in performance issues in scenarios in which the working data size exceeds the physical memory size.

Figure 2:
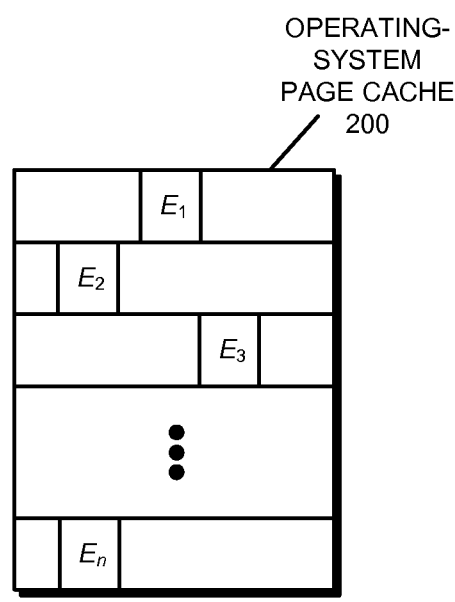
FIG. 2 is a drawing illustrating an operating-system page cache in an existing caching technique.
Figure 3:
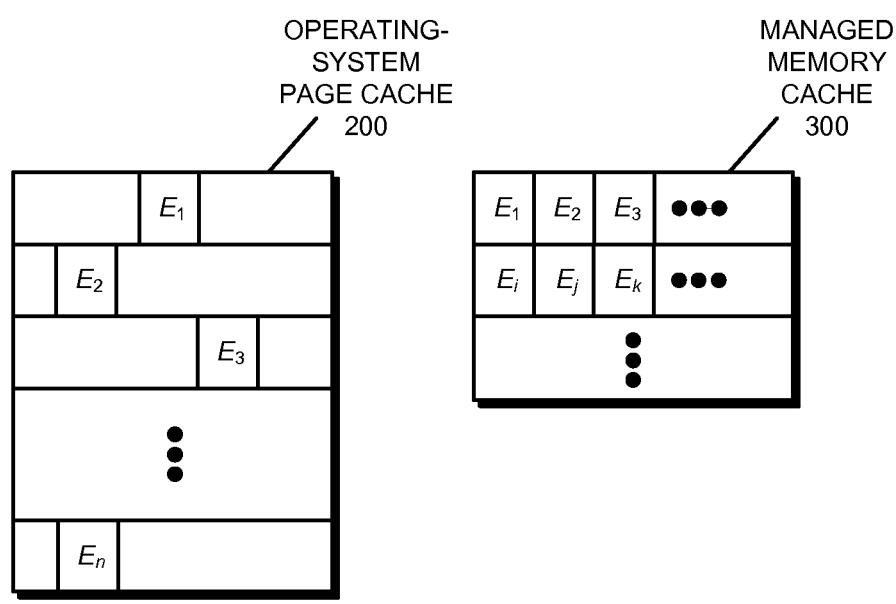
FIG. 3 is a drawing illustrating an operating-system page cache and a managed memory cache in accordance with an embodiment of the present disclosure.

In order to address the performance problems, the application-layer caching technique uses a combined approach to manage the memory. In particular, this application-layer caching technique may divide the memory-mapped memory space used by an application (which is henceforth referred to as a 'memory-mapped memory footprint') into two parts: a managed memory and an un-managed memory. The managed memory is what the application uses to actively cache application data in memory-mapped files, and the application may be in full control of this space. In contrast, the un-managed memory may rely on simple memory mapping and, practically, may be the operating-system page cache. This is shown in FIGS. 2 and 3, which, respectively, present the different memory representations of an operating-system page cache 200 for use with memory mapping in an existing caching technique, and an operating-system page cache 200 (i.e., the un-managed memory) and a managed memory cache 300 (i.e., the managed memory) in the application-layer caching technique. In particular, FIG. 2 shows a conventional memory footprint for memory-mapped files in which only a 4 kB-aligned page-cache space is used, while FIG. 3 shows the memory footprint in an application-layer caching technique described herein. Note that the application still memory maps the data files, but it maintains its own cache space (with associated predefined caching rules), which has a more efficient way of using the memory space. In addition, note that the managed memory space may only intend to cache data of high utility to the application (e.g., more frequently accessed data or more critical data). As described further below, the managed memory space may be implemented using physical memory and/or virtual memory.

The described application-layer caching technique may effectively implement an application-layer caching mechanism between reading calls and the operating-system disk reading. In the discussion that follows, the application-layer caching technique may also refer to the managed-memory space used by this caching solution. As described further below with reference to FIG. 6, in the application-layer caching technique, when reading from memory-mapped files, the application may first check to see whether its own cache has the requested data or not. If its own cache has the data, it may directly retrieve that data, while discarding the operation of reading from memory-mapped files. However, if its own cache does not have the data, the application may perform memory-mapped reading and insert the read data into its own cache. Then, the application may retrieve the data. In both cases, the application-layer caching technique may optionally update its internally maintained states to improve performance.

Some benefits of the application-layer caching technique result from mitigating the previously described memory-inefficiency problems. In particular, the cache space may be more efficiently used as it can more densely pack the useful data in memory. Moreover, instead of being limited to caching data with the operating system's default page size (as is the case with the operating-system page cache), the managed memory cache can pack the data much more effectively in memory. Furthermore, the more effective use of memory may result in more events being cached and, thus, in fewer cache-misses, which, in turn, may reduce data thrashing.

Additionally, when the requested data is 'hit' in the application-layer caching technique, a disk-file reading action may be avoided. This may also avoid unnecessary operating-system-level prefetching, which can inflate disk IO and memory usage. Additionally, the application-layer caching technique may be application-aware. This may allow the application to take advantage of the data-access pattern(s) associated with an application, and to prioritize the caching of data that is more important to the application. Consequently, the cache-replacement technique(s) used in the application-layer caching technique may be application-aware, which is in sharp contrast with the blind LRU typically used in the operating-system page-replacement technique.

The application-layer caching technique may also have some other advanced features. In particular, the application-layer caching technique may automatically determine the optimal cache-space size for an application. Moreover, the application-layer caching technique may dynamically adjust the cache-space size based on the data-access patterns. Furthermore, the application-layer caching technique may allow multiple, different cache-replacement techniques to be used. Additionally, when an application reads from multiple memory-mapped files (or from different portions of the same memory-mapped files), the application may create a separate cache space for each file (or each portion of a file) based on different properties (e.g., the data-access pattern, the utility, etc.) of this data. In some embodiments, the application-layer caching technique stores a particular application's data-access pattern(s), and may perform application-layer prefetching to boost the performance of later runs. For example, an application may sequentially read some data blocks to perform certain operations. The application-layer caching technique may record the sequence and may prefetch later data proactively for the application. Note that the application-layer caching technique may allow the application to control some internal operations and may give hints to the managed memory cache. For example, the application may: explicitly determine the minimum or maximum size of the cache space, enable/disable space-size resizing, and/or select the cache-replacement technique.

The application-layer caching technique may improve the reading performance by supplying cached data rather than fetching from disks. This approach may work particularly well when the raw memory-mapped files on disk do not change. However, when the disk version of the data has changed, the application-layer caching technique may need to invalidate the corresponding cached entries to ensure data integrity. The application-layer caching technique may allow the application to invalidate the cache entries by explicitly invalidating notification calls or by implicitly handling the writing calls of memory-mapped files. In the case of implicit invalidation through handling the writing calls, whenever the application-layer caching technique needs to write to data in a memory-mapped file, it may internally check to see whether the corresponding cache entries exist or not. If the entries exist, the application-layer caching technique may remove these entries. Otherwise, the application-layer caching technique may simply pass through.

We now further describe embodiments of the application-layer caching technique. The application-layer caching technique may be useful in embodiments in which the memory-mapped working data size is larger than the available page cache. In embodiments where all the data can be loaded into physical memory, the application-layer caching technique may provide less benefit because of its overhead, including the cache-checking operation during data reading. This overhead can be removed by allowing the applications to only use the application-layer caching technique when it is suitable. Alternatively or additionally, the application-layer caching technique may be implemented smartly so that it can automatically identify such embodiments and can respond accordingly.

The application-layer caching technique may help improve the performance of applications that supply data from read-only memory-mapped data (e.g., applications that provide query service). Although the application-layer caching technique can also be used with applications that write to memory-mapped files, depending on the ratio of read and write operations the performance benefits may be reduced. In general, the more read operations (and the fewer write operations), the larger the performance gain that may be provided by the application-layer caching technique. Note that the aforementioned read-only embodiments may not be restricted to read-only applications. Instead, in these embodiments some of the data files may be writable, while other data may be read-only. Alternatively, in these embodiments the read-portions and the write-portions of the files may be separate.

Embodiments of the application-layer caching technique can be application-specific or application-transparent. In particular, the application-layer caching technique can be implemented either inside an application or outside an application, resulting in application-specific or application-transparent implementations, respectively. When the application-layer caching technique is implemented inside an application, it may provide application-specific caching. This approach may provide the advantage of tight integration with the application and, thus, may offer simplified design considerations. For example, if an application only reads from memory-mapped files, but does not write at all, then the application-layer caching technique can be implemented without considering caching invalidation. However, because the logic of the application-layer caching technique is usually independent from the application logic, such an application-specific implementation may complicate the application design.

Moreover, providing an application with its own cache may complicate the application's design because of the associated memory management. Although the designs of the application-layer caching technique can be internally implemented by a particular application, in order to address the complication concerns, in some embodiments an application-independent approach is used. This may ensure that applications are free of the implementation details of the application-layer caching technique. In order to simplify the presentation, in the discussion that follows the application-independent embodiments of the application-layer caching technique are used as an illustration.

The application-independent embodiments of the application-layer caching technique may wrap the cache-management mechanisms in a library, which is independent of any application and can be called by multiple different applications. With this approach, there may only be a small change needed to the application code. In particular, instead of calling a traditional command to get some data (e.g., getChar( )), the application can gain the benefits of the application-layer caching technique and the managed memory cache by calling the library's exposed application programming interface or API (e.g., getCharCache( )). Thus, the memory management details (such as memory replacement, inserting, and deleting) may be internal to the library, so the application may not need to be aware of these memory-management details.

Figure 4:
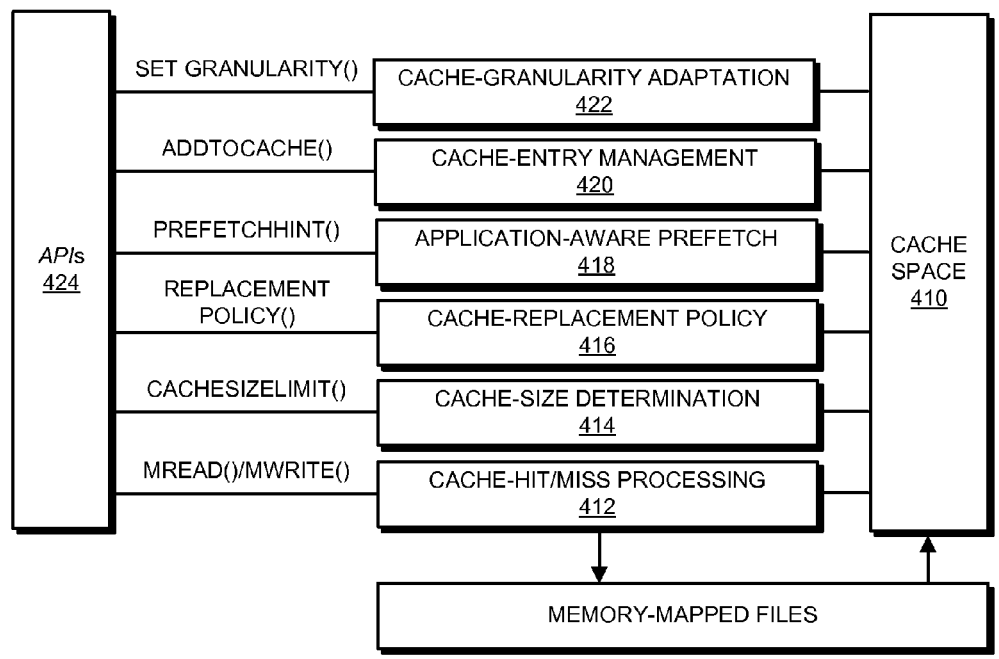
FIG. 4 is a drawing illustrating components in an application-layer caching technique in accordance with an embodiment of the present disclosure.

As shown in FIG. 4, which presents a drawing illustrating components or modules in the application-layer caching technique, the application-layer caching technique may involve or may use: a cache space 410, cache-hit/miss processing 412, cache-size determination 414, a cache-replacement policy 416, application-aware prefetching 418, cache-entry management 420, and/or cache-granularity adaptation 422. With the exception of the internal cache space, the other components and modules may expose public APIs 424 to allow applications to control the associated operations.

Cache space 410 may be an internal cache space that is maintained by the application-layer caching technique, and which stores the memory mapped data. This cache space may facilitate fast insertion, deletion, update, lookup and cache replacement. Cache space 410 may contain a list of cache entries, and each cache entry may be defined as <MmapRead, MmapValue>, where MmapRead is the reading operation of the memory-mapped files, and the MmapValue is the data.

In some embodiments, a hash table is used to organize the cache entries. The insertion, deletion, updating and lookup may be handled in O(1). In order to allow for fast replacement, the caching entries may be double-linked. In particular, depending on the caching technique, the double link may be implemented in different ways. For example, if the application-layer caching technique includes LRU, then the double link may be organized based on data-access time. Moreover, the head of the double link may include newly inserted caching entries. Whenever a cache entry is updated (e.g., is read by an application), it may be moved to the head of the double-linked list, and the associated pointers in the double-linked list may be updated. In contrast, the tail of the double link may include the least recently used caching entry. When the cache space reaches its size limit, the tail of the double link may be removed, and the associated pointers in the double-linked list may be updated.

Figure 5:
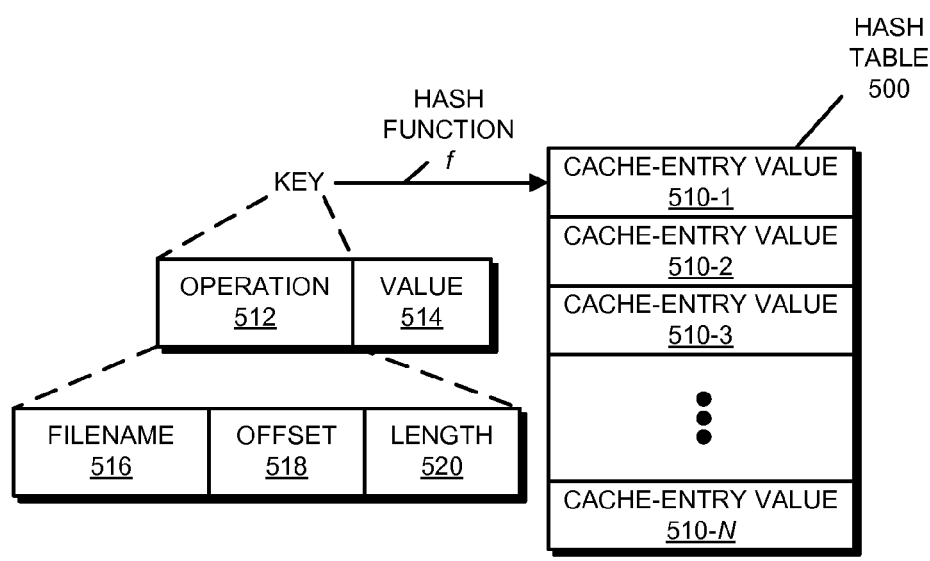
FIG. 5 is a drawing illustrating a hash table associated with a managed memory cache in accordance with an embodiment of the present disclosure.

FIG. 5 presents a hash table 500 that can be used to map cache entries in cache space 410 to memory mapped data. This hash table may include cache-entry values 510. A given cache-entry value, such as cache-entry value 510-1, may specify: an identifier of the memory mapped data (e.g., a file or mapped data), a virtual memory address and a requested data size. Moreover, a key of a given cache-entry value (such as cache-entry value 510-1) may include an operation 512 (such as a particular data read request). For example, in general operation 512 may include filename 516, offset 518 and length 520. However, for the components of cache merging/splitting and cache invalidation, operation 512 may be slighted changed. In particular, it may include a filename 516 and an 'aligned-offset.' For any offset, an aligned-offset means only taking the higher-order 'digits' of the offset. Thus, if offset 518 is 10440 and the aligning unit is 1000, then the aligned-offset is 10000. Moreover, a hash function ƒ applied to filename 516, offset 518 and length 520 may uniquely (or with a very low probability of a conflict) specify cache-entry value 510-1. In the event of a conflict, note that hash table 500 may include a list for one or more cache entries that can be used to resolve the conflict. Furthermore, note that value 514 may include the requested data, in the form of a byte array or language-specific data types, e.g., integers and/or characters.

Referring back to FIG. 4, cache space 410 may be: a single cache space covering all (or many) of the memory-mapped files by an application (or by multiple applications), per-file based, or per data-segment based (i.e., there may be multiple cache spaces per file). If the data-access patterns of the files are similar, then a global cache space makes sense. For example, a water-supply application may maintain one file per city, and all the files may be equally likely to be accessed. However, for many applications, different memory-mapped files may be accessed with different frequencies and/or patterns. In these embodiments, a per-file based design is more appropriate. A per-file based cache space may allow the application-layer caching technique to finely tune the caching technique in a manner specific to the data-access pattern(s) of each file. In particular, the cache-size limit of each memory-mapped files may be different based on the different data-access frequencies of these files.

Figure 6:
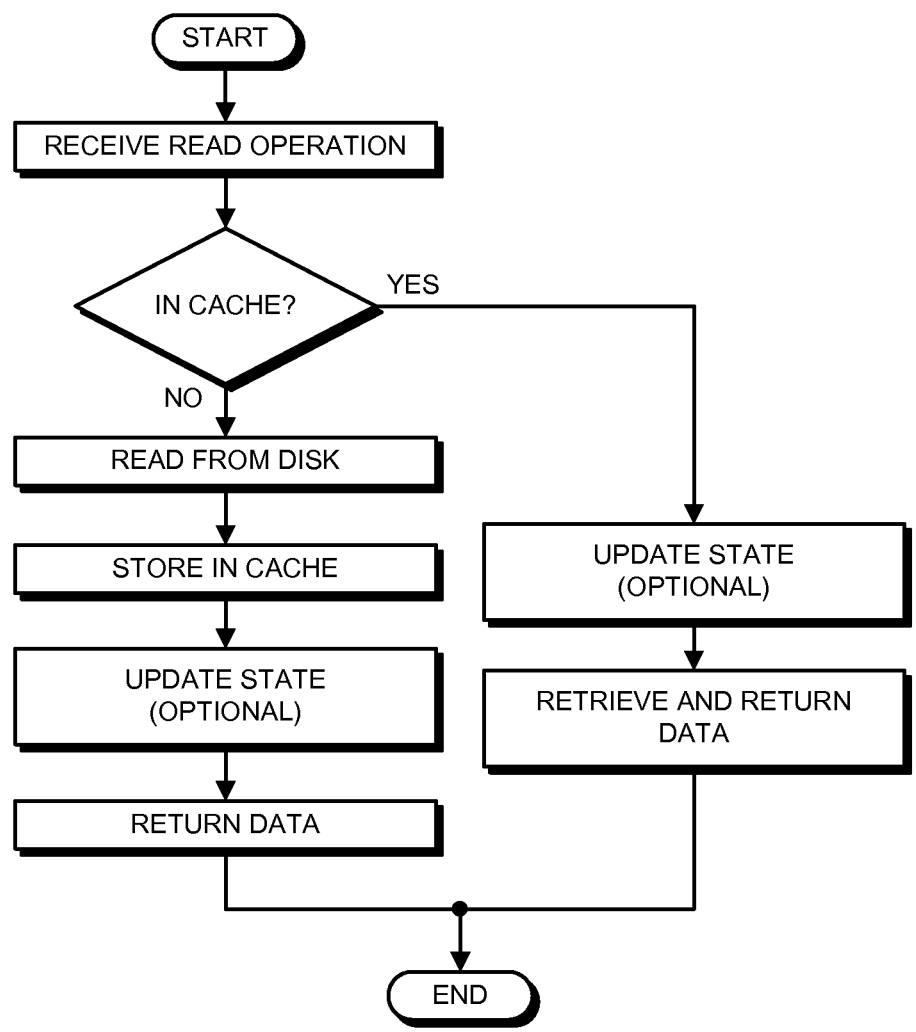
FIG. 6 is a flow chart illustrating a method for caching data in accordance with an embodiment of the present disclosure.
Figure 13:
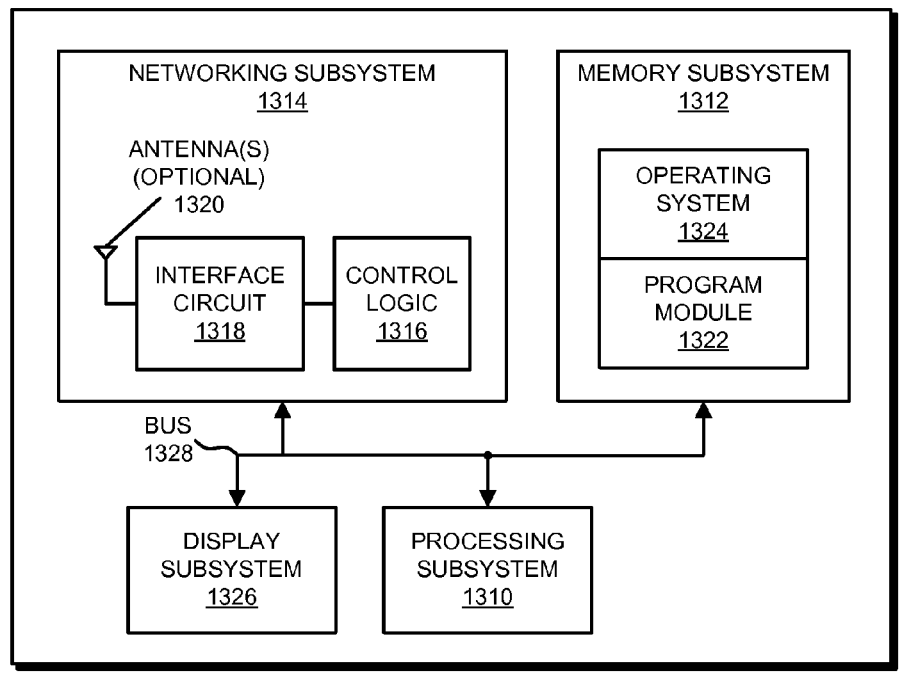
FIG. 13 is a block diagram illustrating a computer system that performs the methods of FIGS. 6-12 in accordance with an embodiment of the present disclosure.

Cache-hit/miss processing 412 is shown in FIG. 6, which presents a flow chart of method 600 for caching data. This method may be performed by computer system 1300 (FIG. 13). In particular, when the application performs a data-reading activity or operation, the application may call the application-layer caching technique's corresponding public API. In response, the application-layer caching technique may internally check whether the requested data is in the cache space or not. If the data is cached, then a cache-hit results, and the data is returned to the application. Otherwise, when the data is not cached, then a cache-miss occurs. The application-layer caching technique may then: call or perform a conventional memory-mapped reading to obtain the data, put the data into cache space (which may include adding a cache-entry value into hash table 500 in FIG. 5), and return the data to the application. In addition, the application-layer caching technique may update state information, such as one or more counters.

Note that the caching may also be based on data-access patterns. For example, if data is read once, it may not be cached. However, if a portion of the data is read more than once, regularly or frequently, this portion of the data may be cached. In some embodiments, a frequency threshold is used during a time interval (e.g., 2) to gate caching. Thus, caching of data may be based on the average number of accesses during a time interval.

In some embodiments, during cache-hit/miss processing 412 (FIG. 4), the application-layer caching technique exposes the public API set of MRead*( ) and MWrite*( ), which correspond to different types of data. For example, for the operations of reading and writing of an Integer (in Java it is four bytes long, getInt( ) and putInt( ), as defined in MappedByteBuffer class), the application-layer caching technique may have MReadInt( ) and MWriteInt( ) wrapping methods for the application to use. Note that MReadInt( ) may be in the form of MReadInt(ByteBuffer bf, int offset), which reads an integer at the particular offset from the particular ByteBuffer.

Figure 7:
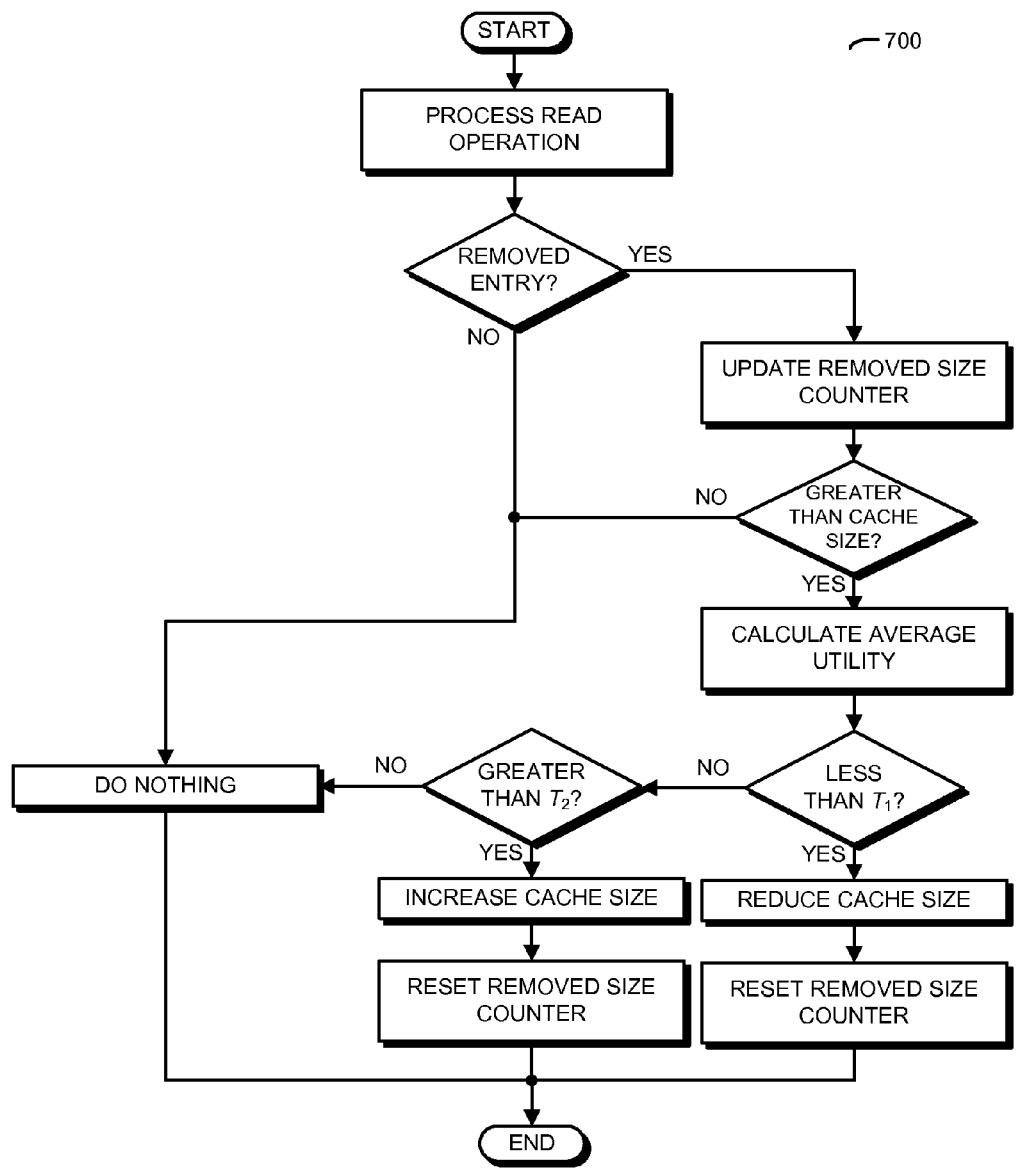
FIG. 7 is a flow chart illustrating a method for dynamically determining a cache size in accordance with an embodiment of the present disclosure.

Cache-size determination 414 (FIG. 4) is shown in FIG. 7, which presents a flow chart of method 700 for dynamically determining a cache size. This method may be performed by computer system 1300 (FIG. 13). In particular, the internally maintained cache space may allow dynamic (on-the-fly) size control. On one hand, the size should be big enough to achieve its intended goal. Alternatively, the size should not grow too big because of the associated housekeeping overhead and the loss of memory from other applications. In addition, each application and each memory-mapped file may have different data-access patterns. Consequently, using a fixed cache size may not work well or provide optimal performance. Instead, in the application-layer caching technique, the application may control the size of each cache space. Furthermore, the application may dynamically adapt the cache-size limit based on the particular application's data-access pattern(s).

Although a naive treatment of cache-size limit could involve a fixed or hard-set cache-size limit for each file based on knowledge and experience, in the application-layer caching technique the cache size may be dynamically (i.e., on-the-fly) adapted, for a given file, based on the accumulated data-access pattern(s). The basic idea of size adaptation is to grow the cache size if the application-layer caching technique predicts that caching more data is worthy. Otherwise, the cache size may shrink or decrease. The decision as to whether to grow or to shrink the cache space (such as the managed memory cache) may be based on caching effectiveness, such as a metric that measures the cache-hits for previously cached data that are subsequently removed from the cache. Specifically, the application-layer caching technique may monitor the cache-hits of least useful formerly cached data that are removed from the cache. If the average number of cache-hits for this group are below a first threshold (e.g., $T_1$ equal to 1.5), then the application-layer caching technique may shrink the cache space. Alternatively, if the average number of cache-hits of those least useful formerly cached data is above a second threshold (e.g., $T_2$ equal to 2), then the application-layer caching technique may grow the cache space.

In an exemplary embodiment, every time an existing cache entry is removed because of a cache-space limit, the cache-hit count for the removed cache entry may be recorded. This information will be used by cache-size determination 414 (FIG. 4) to grow, shrink or maintain the current cache-space size. For example, if a cache entry was never referenced again after being cached, the cache-hit count may be zero, indicating no benefit of caching that cache entry. However, if the cache-hit is larger than zero, it means the cache entry has been referenced after being cached and may have potentially saved disk IO. Note that the cache-size determination may be based on the relative value of average cache-hits of removed cache entries and some threshold values, such as $T_1$ and $T_2$. In addition, note that determination as to whether the cache size should be grown or shrunk may be performed when the size of the formerly cached entries during a time interval (such as 10 or 30 minutes) equals or exceeds the current cache size. Alternatively or additionally, the determination as to whether the cache size should be grown or shrunk may be performed when the number of formerly cached entries equals or exceeds the number of currently cached entries and/or based on time (such as every 10 or 30 minutes).

In some embodiments, the application-layer caching technique exposes the public API of CacheSizeLimit(CacheSpace cache, int minSize, int maxSize, float growThreshold, float shrinkThreshold) to allow the application to control the internal cache-size mechanism of the previously created cache space. Note that minSize may be the minimum file size (and the default may be zero). Moreover, the default maxSize may be one hundredth of the memory-mapped file size, and growThreshold may be the threshold value to grow the cache space. When the average cache-hits of previously removed caching entries exceeds growThreshold, the cache space may increase. Similarly, shrinkThreshold may be the threshold value to shrink the cache space. When the average cache-hits of previously removed caching entries is below shrinkThreshold, the cache space may shrink. Cache-size checking (i.e., growing and shrinking) may be performed periodically for every N removed caching entries. N may initially be set to ten, and then may be updated to the size of the cache space (in number of caching entries) after the cache size exceeds 10. Furthermore, if the managed memory cache in the application-layer caching technique decides to grow or shrink, it may grow/shrink by a certain percentage of the current size. The default percentage may be 20%.

While the application-layer caching technique can perform the cache-size-determination operations automatically with pre-defined thresholds, the application-layer caching technique may also allow the application to finely control the operations. Thus, the application may or may not explicitly set the threshold values.

Figure 8:
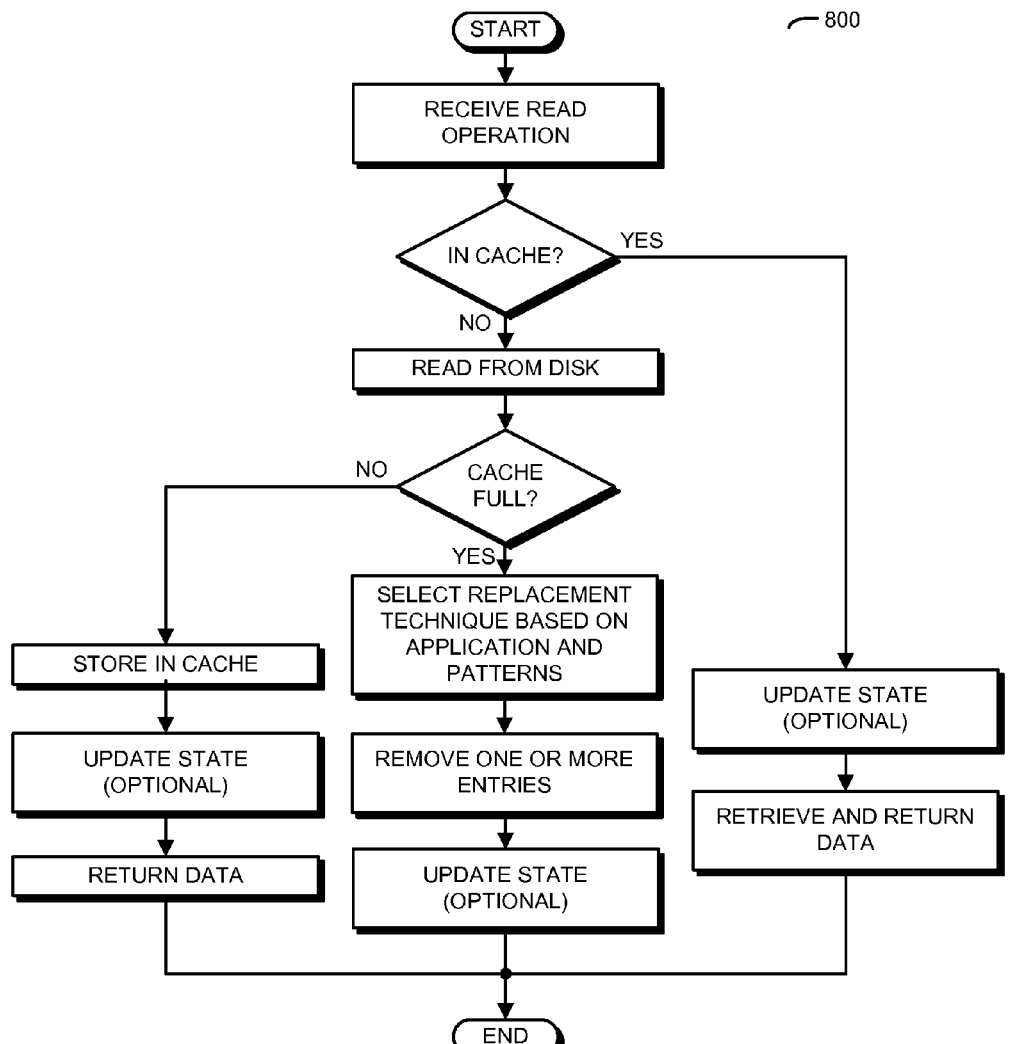
FIG. 8 is a flow chart illustrating a method for replacing data in accordance with an embodiment of the present disclosure.

Cache-replacement policy 416 (FIG. 4) is shown in FIG. 8, which presents a flow chart of method 800 for replacing data. This method may be performed by computer system 1300 (FIG. 13). In particular, if the internally maintained cache space reaches its cache-size limit, a cache-replacement technique may be used. The application-layer caching technique can apply different caching techniques/rules to different cache spaces. Moreover, an application may create multiple cache spaces, and may configure or define different caching techniques/rules when creating them. These caching techniques/rules may include: least recently used (LRU), most frequently used (MFU) and/or least frequently used (LFU). (However, the default caching technique may be the LRU, but depending on the application-usage scenario other caching techniques may work better in terms of the cache-hit ratio.) In general, each file or event may have a different data-access pattern and, thus, may have its own cache space and caching technique/rules. Consequently, the cache space may be divided into multiple sub-spaces, each with its own caching technique/rules. Alternatively, each data type may have its own caching technique/rules.

In some embodiments, the application-layer caching technique exposes the public API of ReplacePolicy(CacheSpace cache, ReplacementPolicy policy) to allow the applications to explicitly set the cache-replacement technique for a cache space.

Figure 9:
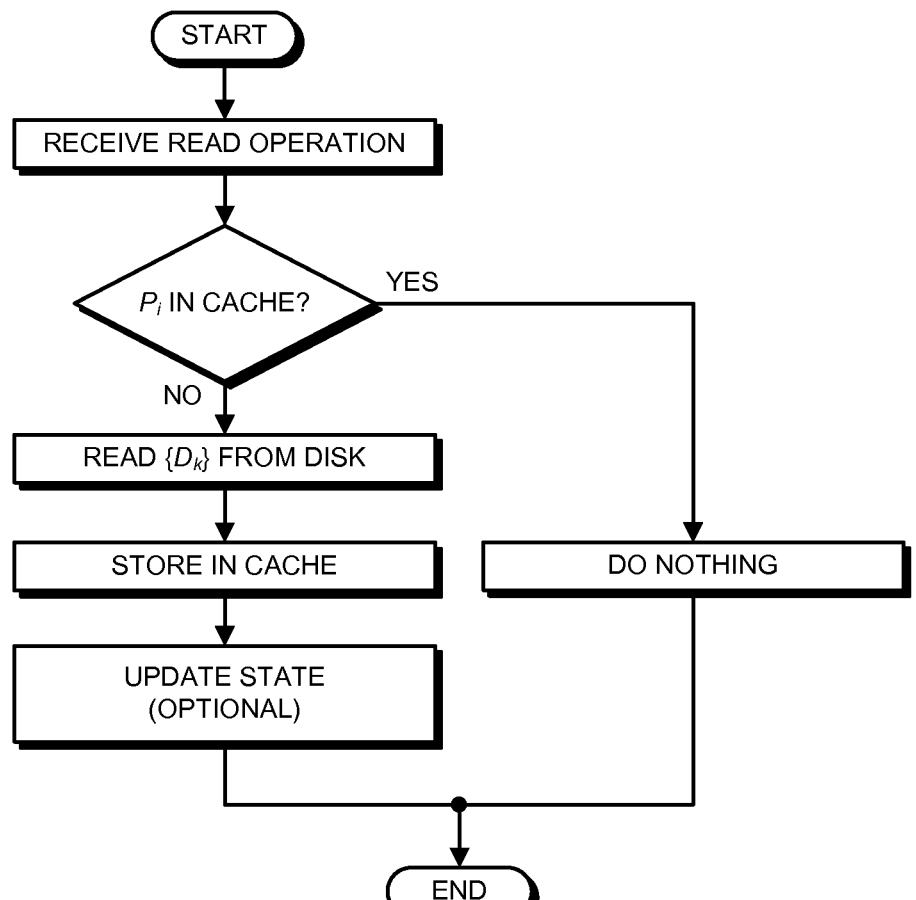
FIG. 9 is a flow chart illustrating a method for prefetching data in accordance with an embodiment of the present disclosure.

Application-aware prefetching 418 (FIG. 4) is shown in FIG. 9, which presents a flow chart of method 900 for prefetching data. This method may be performed by computer system 1300 (FIG. 13). Application-layer prefetching may improve the performance. For example, when an application first starts, it may need to read certain data from disks. If those data can be prefetched, the application's startup delay can be reduced. As another example, when an application performs certain operations (e.g., supply an incoming query), it often needs to read a particular set of data. A prefetching technique may help reduce the application latency (e.g., query latency) because the data can be read from memory rather than from disks. Note that the application-layer caching technique may be able to learn the data-access patterns, and the prefetching may be based on these learned patterns. In particular, for each pair of cached data entries or events within a certain time period, the application-layer caching technique may build or determine a correlation degree or value (or a conditional probability) that indicates whether these two data entries can benefit from prefetching. If application-aware prefetching is enabled, reading a cached entry may trigger the prefetching of other highly correlated cache entries. Furthermore, the application-layer caching technique may also allow the application to enable/disable and to control the prefetching mechanism. For example, the application-layer caching technique may allow the application to register the correlated caching entries.

In an exemplary embodiment, application-aware prefetching 418 (FIG. 4) automatically learns or determines the correlation between memory mapped data (i.e., caching entries) through correlation profiling. The higher correlation degree between two cache entries, the more likely they will be prefetched when either entry is accessed. In particular, for two cache entries $D_i$ and $D_j$, the correlation degree $C_{i,j}$ may be defined as the time difference between accesses of the two entries. Note that the access time may be based on logical time to avoid a heavy system call to determine the real clock. The application-layer caching technique may maintain an internal clock, and may increase it by one for every read access. In order to further reduce overhead, the $C_{i,j}$ may only be updated if the clock difference is below a certain threshold of T.

The result of the correlation profiling is that for every cache entry, the application-layer caching technique may have a correlated entry set of $P_i$, such that the element $D_k$ in $P_i$ has $C_{i,k}$ greater than CT, where CT is the correlation threshold (which may be specified by the application). For example, CT may be selected so that $P_i$ includes 10 entries or elements. When a cache entry of $D_i$ in $P_i$ is accessed, application-aware prefetching may check the correlated entry set of $P_i$ and may prefetch the remainder of $P_i$ if these entries are not in cache space.

Note that the correlation profiling may be dynamically enabled/disabled by the application. Correlation profiling may incur overhead in the form of computation and memory usage. Consequently, it may be useful to keep the overhead to a minimum. In particular, the correlation profiling may work after the application starts, and may keep working until the cache space is full.

In some embodiments, the application-layer caching technique also allows the application to explicitly control application-aware prefetching 418 (FIG. 4) by registering prefetching orders. It may expose the public APIs to enable this capability. The form of the APIs can vary in different embodiments. One example is PrefetchHint(MmapRead ops, MmapRead[ ] fetchData). For the particular MmapRead operation, the list of fetchData may be prefetched. Whenever application-aware prefetching sees the reading operation of ops, it may proactively prefetch fetchData. Another example is to register the correlation of two operations, such as PrefetchCorrelate(MmapRead ops1, MmapRead ops2), so that either operation may trigger the prefetching of the other.

Figure 10:
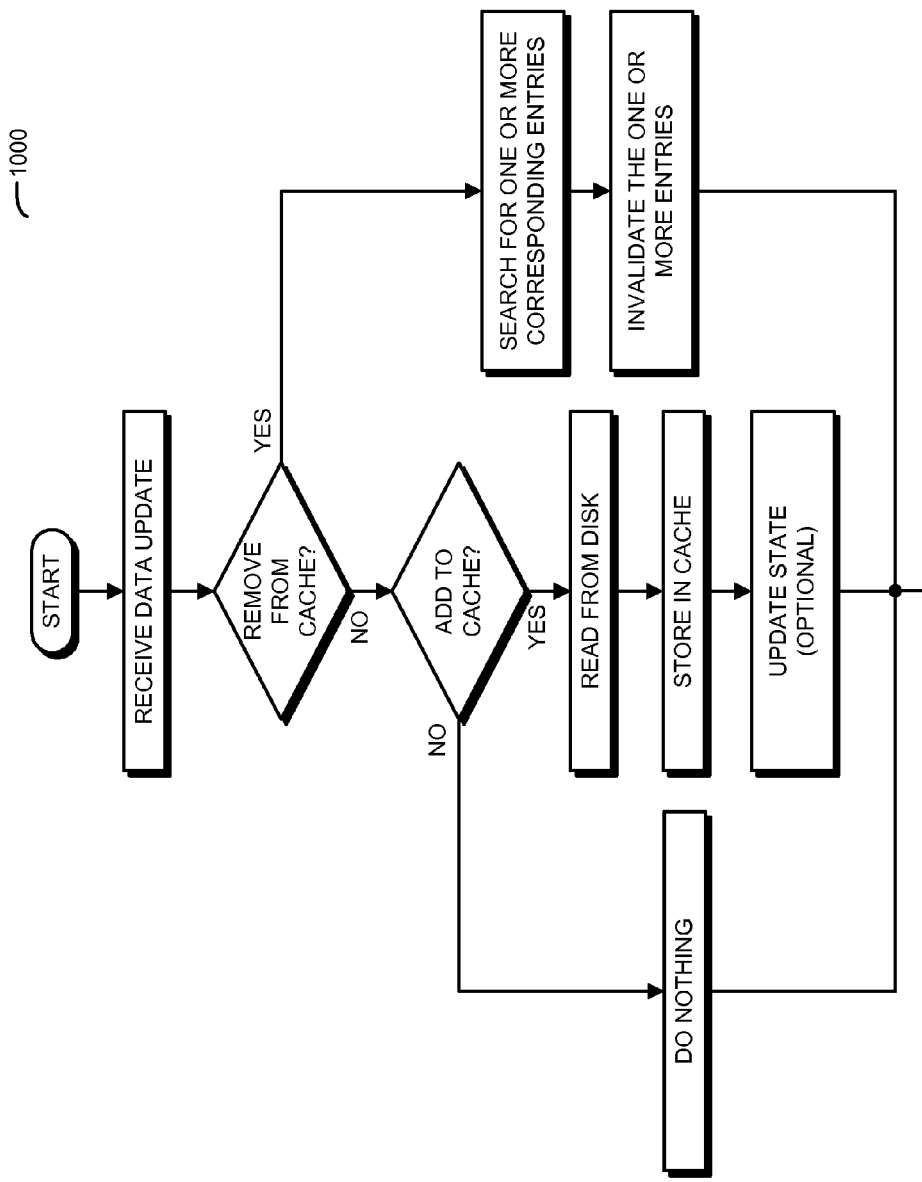
FIG. 10 is a flow chart illustrating a method for adding/removing cache entries in accordance with an embodiment of the present disclosure.

Cache-entry management 420 (FIG. 4) is shown in FIG. 10, which presents a flow chart of method 1000 for adding/ removing cache entries. This method may be performed by computer system 1300 (FIG. 13). In particular, the application-layer caching technique may allow applications to explicitly add or remove cache entries. When adding a cache entry, if the cache entry does not exist in cache space, then it is added to the end of the cache space. However, depending on the embodiment of the application-layer caching technique, if the added cache entry already exists in the cache space, then it may be updated in the form of a reference count update or by moving the cache entry to the beginning of the cache space.

The application-layer caching technique may explicitly invalidate a cache entry or a range of cache entries. Such invalidations may occur when applications write to memory-mapped files. For example, when the data corresponding to a particular cache entry is modified, the application-layer caching technique may immediately invalidate it. The application-layer caching technique may also allow applications to invalidate a range of bytes of the memory-mapped files. In this case, the application-layer caching technique may then search for all corresponding cache entries and invalidate them. Note that the search may be based on the byte offsets and the lengths of the cache entries.

In some embodiments, cache-entry management 420 (FIG. 4) allows the application to create a cache space and add memory-mapped files to an existing cache space. In particular, the application-layer caching technique may expose the public API of CacheInitiate(String fileName) and AddToCache(CacheSpace cache, String fileName). CacheInitiate(String fileName) may create a new cache space and return the identifier of the cache space. AddToCache may add a new file to an existing cache space. In addition, AddToCache may allow applications to add cache entries to an existing cache space. The API call may be AddCacheEntry(CacheSpace cache, CacheEntry entry). Similarly, a cache entry can be invalidated/removed by calling RemoveCacheEntry(CacheSpace cache, MMapFile file, int offset, int length), which may remove the range of data bytes of the memory-mapped file from cache space cache. Note that the data bytes may start from 'offset' with a length of 'length.'

Figure 11:
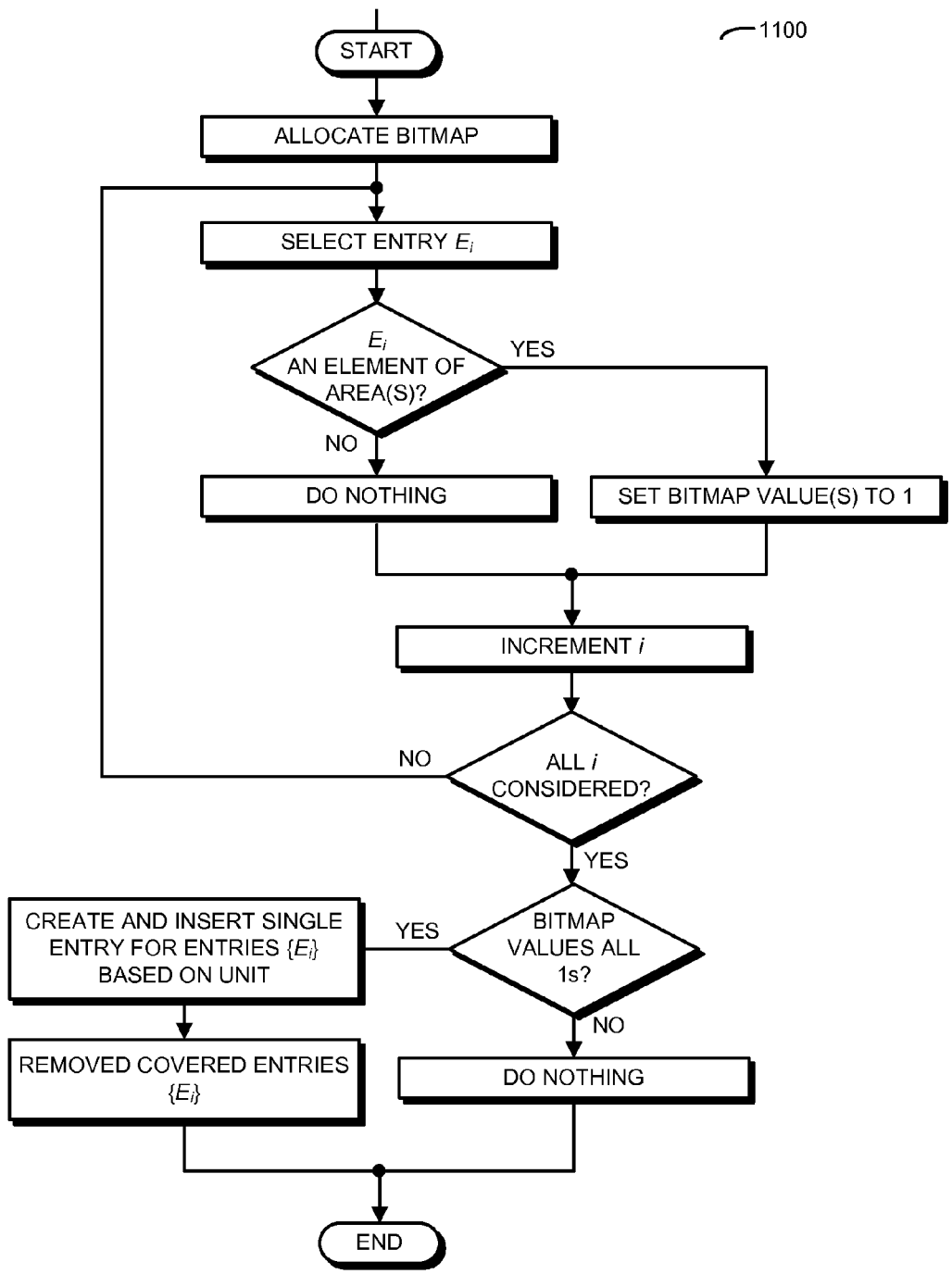
FIG. 11 is a flow chart illustrating a method changing cache granularity in accordance with an embodiment of the present disclosure.
Figure 12:
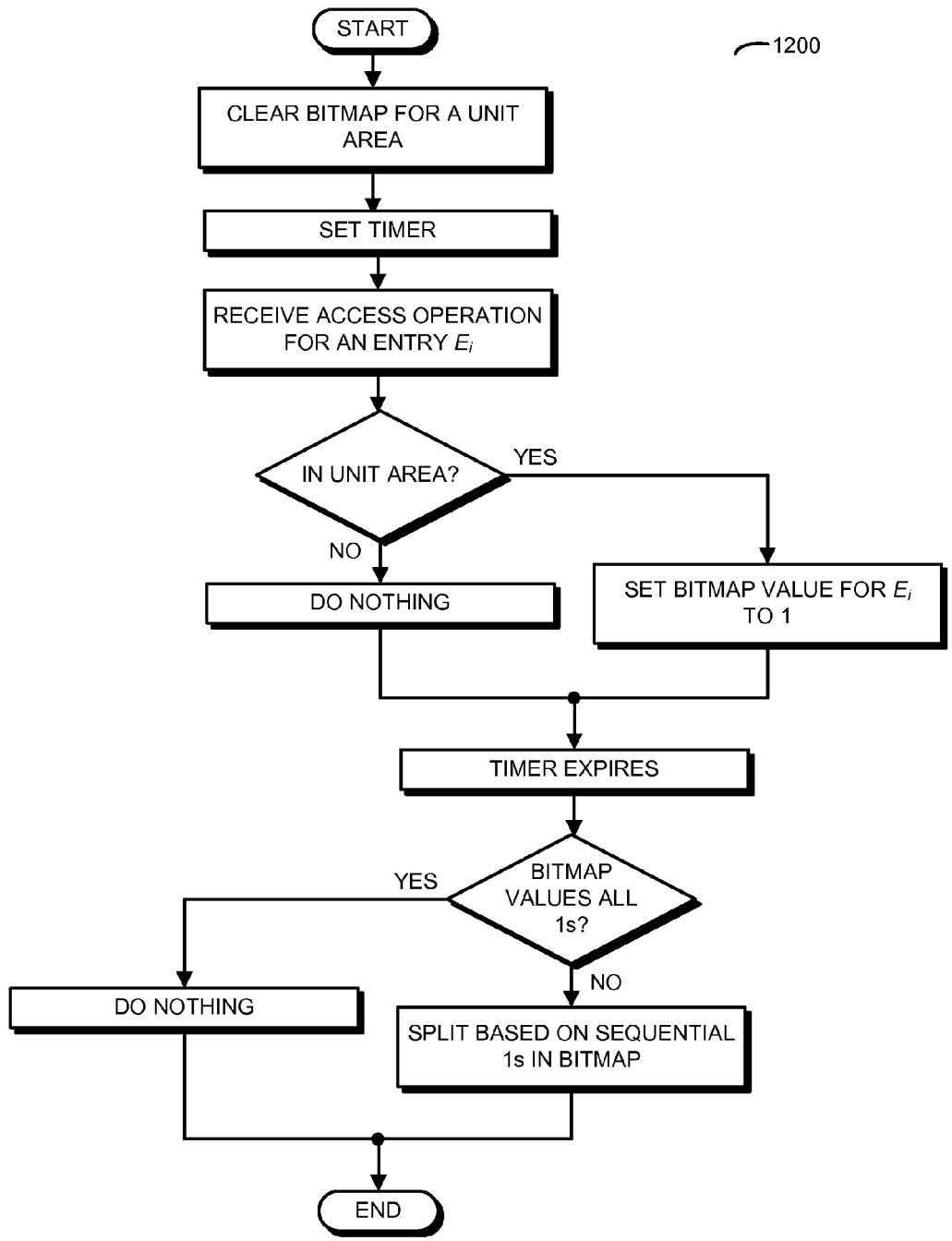
FIG. 12 is a flow chart illustrating a method changing cache granularity in accordance with an embodiment of the present disclosure.

Cache-granularity adaptation 422 (FIG. 4) is shown in FIGS. 11 and 12, which present flow charts of methods 1100 and 1200 for changing cache granularity. This method may be performed by computer system 1300 (FIG. 13). In some embodiments, the application-layer caching technique dynamically adjusts the caching granularity. Caching granularity may be defined as the data unit that composes caching entries. The finest level of caching granularity in the application-layer caching technique and the managed memory cache may be one or more bytes (e.g., 1 byte of characters). Similarly, the coarsest level of granularity in the application-layer caching technique and the managed memory cache may be a file (e.g., an entire file is cached). Note that the caching granularity may be an internal property of the application-layer caching technique, which may not be known to the applications that use the application-layer caching technique.

In general, there may be performance tradeoffs of using a particular caching granularity level with regard to space used, searching/adding/deleting speed, etc. The application-layer caching technique may internally and dynamically adjust the caching granularity levels to strike a performance balance. In particular, when a cache entry is first inserted, it may be maintained at the byte level based on the number of bytes it contains. For example, in Java, reading or writing an integer is in the unit of four bytes, therefore the associated cache entry may contain or include four bytes of memory mapped data. However, when more and more cache entries are added to the cache space falling inside a page range (e.g., multiple cache entries are on the same page of 4 kB), the application-layer caching technique may automatically cache the entire page instead. The argument for this merging is that the particular page contains or includes enough popular data bytes that justify the caching of the entire page. For example, if bitmap values for all the entries in a unit area is set to one, then these entries may be merged into a common entry in the cache space. Note that the benefits of dynamically adjusting the caching granularity may include: reducing the number of caching entries and the corresponding storage space, increasing searching/maintaining speed, etc. In addition, note that such merging in the cache space can continue until it reaches the granularity level of the entire file.

Furthermore, the application-layer caching technique may also decrease caching granularity levels dynamically or on-the-fly. In particular, when usage patterns suggest that a particular granularity level for certain cached data is too coarse (e.g., when only a portion of a cached entry is used), then the application-layer caching technique may break down the data range into smaller cache entries. For example, when a page of data (e.g., 4 kB) is cached, if the application-layer caching technique determines that only a few bytes of data are actually needed during a time interval (such as 10 or 30 minutes), it may: extract that data, create a cache entry, and discard the other data in the page.

In an exemplary embodiment, for the current level of caching granularity, if enough or sufficient bytes (e.g., a percentage larger than Level_Up_Threshold) exist in the cache space for the next higher level of granularity, then cache-granularity adaptation 422 (FIG. 4) may move up to the higher level. When this occurs, existing cache entries falling into the higher level of the caching unit may be merged. For example, if the current caching granularity is byte-level, the next granularity is page-level (such as 4 kB), and Level_Up_Threshold equals 40%, then if more than 1.6 kB of data in a particular page are in the cache space, the particular page may be treated as a single cache entry. All cache entries in this page may be merged, and other bytes may be fetched to fill the page.

The leveling down process is similar, except that it may use another Level_Down_Threshold value (which is lower than Level_Up_Threshold). The use of two threshold values may help avoid granularity-level thrashing, i.e., increasing/decreasing granularity levels too frequently. Note that, for the current granularity level, if the Level_Down_Threshold percentage of the data bytes are not accessed anymore (such as 20%), then cache-granularity adaptation 422 (FIG. 4) may break down into smaller caching entries based on data-access patterns.

In some embodiments, cache-granularity adaptation 422 (FIG. 4) allows applications to explicitly control the granularity of a particular cache space by an API call of setGranularity(CachingSpace cache, GranularityLevel level). Furthermore, note that the GranularityLevel may be defined at different levels, including: byte, page, hugepage (i.e., larger than the operating system's default page size), and/or file.

In some embodiments of methods 600 (FIG. 6), 700 (FIG. 7), 800 (FIG. 8), 900 (FIG. 9), 1000 (FIG. 10), 1100 (FIG. 11) and/or 1200 (FIG. 12), there may be additional or fewer operations. Moreover, the order of the operations may be changed, and/or two or more operations may be combined into a single operation. Note that, in general, the parameters used in the methods and by the application-layer caching technique may be explicitly controlled and set by the application. In some embodiments, the application-layer caching technique exposes a public API of CacheConfig(String parameter, float value) for this purpose.

We now describe exemplary embodiments of the deployment and usage of the application-layer caching technique. Many languages support memory-mapped files, so in order to take advantage of the application-layer caching technique the implementation options may differ for different languages. However, as shown in FIG. 5, the application-layer caching technique has a managed part of memory that is different from the operating-system page cache, so the managed memory space can be implemented in different forms. For example, the managed memory space can be implemented in: a memory space managed by a runtime specific, e.g., heap Java virtual machine, native memory (e.g., malloc( ) calls), and/or a special memory-mapped file. In the discussion that follows, Java is used as an example.

Java maintains a heap, which is essentially a memory space managed by the Java virtual machine. Managed memory in the application-layer caching technique naturally can be implemented in a heap (e.g., by using hash tables). However, Java also supports direct memory (which is off-heap memory). Alternatively (and less intuitively), the managed part of the application-layer caching technique can also be implemented in a memory-mapped files. Although any memory-mapped file actually can be affected by operating-system page-caching techniques, by directly manipulating the bytes in the memory-mapped file, it can be used to effectively utilize the memory space.

Furthermore, the application-layer caching technique may be directly implemented inside application code. However, as noted previously, another approach is to make it a library (or API package) for an application to call. The library (or API package) may internally encapsulate the details of the application-layer caching technique, and may only expose certain public APIs for the application to call. For example, the library may expose readCharSmart(int offset) method to applications, and applications may simply call the method and expect it to return the same value as if it is calling readChar(int offset).

In an exemplary embodiment, the application-layer caching technique is implemented in Java. The cache space uses a per-file based design. In particular, for a file that is larger than 1 MB, a cache space may be created. Note that the initial and minimum cache-space size may be set to 1/100 of the raw file size, and the maximum cache-space size may be set to 1/10 of the raw file size.

In this example, there may be classes of CacheRead and CacheValue. The CacheRead class may encode the memory mapped read action, which includes the virtual memory address and the requested data size in bytes. Moreover, the CacheValue class may encode the requested data, be it integer, float and/or byte array. Furthermore, the cache-space may use LinkedHashMap class. LinkedHashMap may use a hash table internally, but it may also put the data in a doubly linked list. As described further below, this data structure may allow the LRU caching technique to be easily implemented. Note that the cache entry may be in the form of <CacheRead, CacheValue>. Given a reasonable load factor, the cache-hit and cache-miss checking theoretically incurs O(1) time complexity.

For the cache-hit/miss processing in the exemplary embodiment, when reading an existing cache entry, readEntry( ) method may be called. It may internally move the accessed cache entry to the head of the doubly linked list. Moreover, writeEntry( ) may be the method used to insert a new cache entry. Internally, it may add the number of bytes to the total cache size, which may be used to determine when the cache space is full. When the cache space is full, the state of the removed cache entry (e.g., reference count, size) may be recorded. This information may be used to resize the cache-size limit. Note that cache-hit/miss processing may implement several types of public API, corresponding to different types of data, e.g., MmapRead-Char( ), MmapReadShort( ), MmapReadInt( ), MmapReadLong, MmapReadFloatO, MmapReadDouble( ), MmapReadBytes( ).

Moreover, for the cache-size determination in the exemplary embodiment, the resizing of the cache limit may be based on the average utility associated with the removed cache entries. The utility value may be calculated as the average of reference counters of the removed cache entries since the last resizing of the cache limit. The application-layer caching technique may use two threshold values to decide on the increasing/decreasing of the cache-size limit. For example, the threshold values may be 2 and 1.2, respectively. If the average utility is larger than the larger threshold, then the cache-space limit may be increased by 20%. Otherwise, if the utility value is smaller than the smaller threshold, then the cache-space limit may be reduced by 20%.

Furthermore, for the cache-replacement policy in the exemplary embodiment, LRU may be used. In particular, LRU may be the inherited cache-replacement technique with LinkedHashMap. When a cache entry is accessed, it may be treated as the most recently accessed cache entry.

We now describe embodiments of a computer system for performing the application-layer caching technique. FIG. 13 presents a block diagram illustrating a computer system 1300. This computer system includes processing subsystem 1310, memory subsystem 1312, and networking subsystem 1314. Processing subsystem 1310 includes one or more devices configured to perform computational operations. For example, processing subsystem 1310 can include one or more microprocessors, application-specific integrated circuits (ASICs), microcontrollers, programmable-logic devices, and/or one or more digital signal processors (DSPs).

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program modules or sets of instructions (such as program module 1322 or operating system 1324), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in computer system 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by computer system 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316, an interface circuit 1318 and one or more optional antennas 1320. For example, networking subsystem 1314 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, computer system 1300 may use the mechanisms in networking subsystem 1314 for performing simple wireless communication between electronic devices, e.g., transmitting advertising or beacon frames and/or scanning for advertising frames transmitted by other electronic devices.

Within computer system 1300, processing subsystem 1310, memory subsystem 1312, and networking subsystem 1314 are coupled together using bus 1328. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections between the subsystems.

In some embodiments, computer system 1300 includes a display subsystem 1326 for displaying information on a display, which may include a display driver and the display, such as a liquid-crystal display, a multi-touch touchscreen, etc.

Computer system 1300 can be (or can be included in) any electronic device with at least one network interface. For example, computer system 1300 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a media player, an appliance, a subnotebook/netbook, a tablet computer, a smartphone, a piece of testing equipment, a network appliance, a set-top box, a toy, a controller, a digital signal processor, a game console, a computational engine within an appliance, a consumer-electronic device, a personal organizer, a sensor, a user-interface device, a server, a client computer (in a client-server architecture) and/or another electronic device. Moreover, the network may include: the Internet, World Wide Web (WWW), an intranet, a cellular-telephone network, LAN, WAN, MAN, or a combination of networks, or other technology enabling communication between computing systems.

Although specific components are used to describe computer system 1300, in alternative embodiments, different components and/or subsystems may be present in computer system 1300. For example, computer system 1300 may include one or more additional processing subsystems, memory subsystems, networking subsystems, and/or display subsystems. Additionally, one or more of the subsystems may not be present in computer system 1300. Moreover, in some embodiments, computer system 1300 may include one or more additional subsystems that are not shown in FIG. 13. Although separate subsystems are shown in FIG. 13, in some embodiments, some or all of a given subsystem or component can be integrated into one or more of the other subsystems or component(s) in computer system 1300. For example, in some embodiments program module 1322 is included in operating system 1324.

Moreover, the circuits and components in computer system 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1314, such as a radio. Moreover, the integrated circuit may include hardware and/or software mechanisms that are used for transmitting wireless signals from electronic device 1300 and receiving signals at computer system 1300 from other electronic devices. Aside from the mechanisms herein described, radios are generally known in the art and hence are not described in detail. In general, networking subsystem 1314 and/or the integrated circuit can include any number of radios. Note that the radios in multiple-radio embodiments function in a similar way to the described single-radio embodiments.

In some embodiments, networking subsystem 1314 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the caching technique may be implemented using program module 1322 and/or operating system 1324. Alternatively or additionally, at least some of the operations in the caching technique may be implemented in a physical layer, such as hardware in processing subsystem 1310.

While the preceding embodiments illustrated the application-layer caching technique with cache rules that are included in a library that is separate from the operating system, in other embodiments the library and/or cache rules associated with the application-layer caching technique are included in the operating system.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for prefetching information, the method comprising:
    creating a managed memory cache that is separate from a page cache, wherein the managed memory cache is managed according to predefined caching rules that are separate from the operating-system rules that are used to manage the page cache,
    wherein the predefined caching rules include application-aware caching rules, wherein cache size of the managed memory cache are dynamically determined based on data-access patterns of the data entries, and wherein dynamically determining the cache size of the managed memory cache comprises determining whether to grow or to shrink the managed memory cache based on a metric that measures cache-hits for previously cached data that are subsequently removed from the managed memory cache; and
    prefetching the information from another memory and storing the additional information in the managed memory cache based on data correlations associated with an application executed in an environment of the operating system on the computer.

2. The method of claim 1, wherein the method further comprises storing additional information in the managed memory cache based on the predefined rules.

3. The method of claim 2, wherein the additional information is stored in the managed memory cache when a cache-miss occurs.

4. The method of claim 2, wherein storing the additional information involves replacing second information stored in the managed memory cache; and
    wherein the second information is replaced based on data-access patterns associated with the application.

5. The method of claim 2, wherein the method further comprises maintaining second information in the managed memory cache when storing the additional information; and
    wherein the second information is maintained based on data-access patterns associated with the application.

6. The method of claim 1, wherein the method further comprises merging adjacent data entries in the managed memory cache into a single data entry based on data-access patterns associated with the application.

7. The method of claim 1, wherein the method further comprises separating a data entry into two or more data entries in the managed memory cache based on data-access patterns associated with the application.

8. The method of claim 1, wherein at least one of data entries in the managed memory cache has a page size that is smaller than a minimum page size of the page cache; and
    wherein at least some of the data entries in the managed memory cache have different page sizes.

9. The method of claim 8, wherein the page size of at least the one of the data entries in the managed memory cache is 1 byte.

10. The method of claim 8, wherein at least some of the data entries have different associated predefined caching rules.

11. The method of claim 8, wherein the page sizes of the data entries are dynamically determined based on data-access patterns of the data entries associated with at least the application.

12. The method of claim 1, wherein the managed memory cache is implemented in virtual memory.

13. The method of claim 1, wherein the managed memory cache is implemented in physical memory.

14. The method of claim 1, wherein the predefined caching rules are associated with a library that is called by the application.

15. The method of claim 1, wherein the data entries in the managed memory cache are organized based on a hash table.

16. An apparatus, comprising:
    one or more processors;
    memory; and
    a program module, wherein the program module is stored in the memory and, during operation of the apparatus, is executed by the one or more processors to prefetch information, the program module including:
        instructions for creating a managed memory cache that is separate from a page cache, wherein the managed memory cache is managed according to predefined caching rules that are separate from operating-system rules that are used to manage the page cache,
        wherein the predefined caching rules include application-aware caching rules, wherein page sizes of data entries within the managed memory cache are dynamically determined based on data-access patterns of the data entries, and wherein dynamically determining the cache size of the managed memory cache comprises determining whether to grow or to shrink the managed memory cache based on a metric that measures cache-hits for previously cached data that are subsequently removed from the managed memory cache; and
        instructions for prefetching the information from another memory and storing the additional information in the managed memory cache based on data correlations associated with an application executed in an environment of the operating system on the apparatus.

17. The apparatus of claim 16, wherein the managed memory cache is implemented in one of: virtual memory; and physical memory.

18. The apparatus of claim 16, wherein the predefined caching rules include application-aware caching rules.

19. The apparatus of claim 16, wherein at least one of data entries in the managed memory cache has a page size that is smaller than a minimum page size of the page cache; and
wherein the page sizes of the data entries are dynamically determined based on data-access patterns of the data entries associated with at least the application.

20. A system, comprising:
a processing module comprising a non-transitory computer-readable medium storing instructions that, when executed, cause the system to:
create a managed memory cache that is separate from a page cache, wherein the managed memory cache is managed according to predefined caching rules that are separate from operating-system rules that are used to manage the page cache,
wherein the predefined caching rules include application-aware caching rules, wherein page sizes of data entries within the managed memory cache are dynamically determined based on data-access patterns of the data entries, and wherein dynamically determining the cache size of the managed memory cache comprises determining whether to grow or to shrink the managed memory cache based on a metric that measures cache-hits for previously cached data that are subsequently removed from the managed memory cache; and
prefetch the information from another memory and store the additional information in the managed memory cache based on data correlations associated with an application executed in an environment of the operating system on the computer.

* * * * *